UNITED STATES PATENT OFFICE.

LEWIS FRANCIS AND CYRUS H. LOUTREL, OF NEW YORK, N. Y., ASSIGNEES OF LEWIS FRANCIS.

IMPROVED COMPOSITION OF MATTER.

Specification forming part of Letters Patent No. 41,887, dated March 8, 1864; Reissue No. 1,771, dated September 27, 1864; Reissue No. 1,885, dated February 28, 1865; Reissue No. 3,576, dated August 3, 1869.

*To all whom it may concern:*

Be it known that LEWIS FRANCIS, of the city, county, and State of New York, did invent a new and useful Composition of Matter, and that the following is a full, clear, and correct description of the same.

The nature of the said invention consists in combining glue, glycerine, and sugar or any other analogous saccharine matter—that is to say, saccharine matter which is crystallizable—to form a new and useful composition of matter for various purposes.

In making the said improved composition, the ingredients employed are combined in about the following proportions, namely: glue, fifteen pounds; glycerine, thirty pounds; sugar or other analogous crystallizable saccharine matter, seven pounds. The glue is first soaked in water for about five minutes in order that it, (the glue,) when added to the glycerine, may be thoroughly incorporated with it. The glycerine is placed in a steam-kettle and heated to a temperature of about 200° Fahrenheit, and the glue and sugar or other analogous crystallizable saccharine matter employed are added gradually to the glycerine, the latter being kept well-stirred until all the ingredients have been added and thoroughly incorporated with the glycerine.

The composition thus formed may be cast into thin sheets or cakes of any desired form, ready for commerce. The sheets or cakes are exposed to the air several days, in order that any water remaining in the composition may be thoroughly evaporated, or a vacuum-pan may be used for this purpose. By this last process all liability of the composition to shrink from the presence of water or moisture is obviated.

Sugar and other analogous crystallizable saccharine matters possess a particular advantage over molasses, which is mostly uncrystallizable, in that the composition made from the former can be readily cast again and again, while if ordinary molasses be used it cannot be readily recast again.

It is not desired herein to claim the use of glue, glycerine, and molasses, that having been the subject of a prior invention and application.

The improved composition thus made will be found particularly applicable to the manufacture of a superior article of printers' inking-rollers, to the lining of barrels or vessels for petroleum, fluids, and semi-fluids, as well as dry substances; also, for various purposes where elasticity is required, for taking impressions in various ways, for the formation of casts, and for various other purposes.

It is not intended to confine the patent to the use of the ingredients specified in the proportions specified, as these proportions may be, in some cases, advantageously varied. Neither is it proposed to be limited to the use of glue, as other gelatinous matter may be substituted for glue, and various gums, resins, and bitumen may be employed in part, and the composition thereby improved for some purposes, care being taken that when any one of the gums, resins, or bitumen be used, the same shall be first dissolved by its proper solvent before being added in the manufacture of the composition.

Having thus described the invention, what we claim as new, and desire to secure by Letters Patent, is—

Combining glue, glycerine, and sugar or any other analogous saccharine matter, to form a new and useful composition of matter for various purposes.

LEWIS FRANCIS.
CYRUS H. LOUTREL.

Witnesses:
THEODORUS MCLEOD,
W. O. HICKOK.